(12) United States Patent
Chaudhuri

(10) Patent No.: US 6,324,162 B1
(45) Date of Patent: Nov. 27, 2001

(54) PATH-BASED RESTORATION MESH NETWORKS

(75) Inventor: Sid Chaudhuri, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/089,823

(22) Filed: Jun. 3, 1998

(51) Int. Cl.[7] .......................... G01R 31/08; G06F 11/14; H04B 1/74

(52) U.S. Cl. .................... 370/225; 370/216; 340/825.01; 340/825.16; 714/2

(58) Field of Search ..................................... 370/216–218, 370/221, 225, 228, 242, 244–245, 248; 340/825.01, 825.06, 825.16; 709/239, 242; 714/1–2, 4, 25

(56) References Cited

U.S. PATENT DOCUMENTS

| | | | |
|---|---|---|---|
| 5,182,744 | 1/1993 | Askew et al. | 370/228 |
| 5,235,599 * | 8/1993 | Nishimura et al. | 714/4 |
| 5,495,471 * | 2/1996 | Chow et al. | 370/221 |
| 5,852,600 * | 12/1998 | Russ | 370/228 |

* cited by examiner

Primary Examiner—Wellington Chin
Assistant Examiner—Maikhanh Tran
(74) Attorney, Agent, or Firm—Robert B. Levy

(57) ABSTRACT

Restoration of service in a mesh network (10) upon the failure of a working channel (16) on a link ($14_1$) connecting a pair of nodes (12A and 12D) is accomplished by first attempting to route traffic on an restoration channel (18) in the same link when such a channel is available. If such "localized" restoration can not be accomplished, then the end-point (traffic originating and/or terminating) nodes that are connected by a path that includes the link having the failed working channel then implements a precomputed path. Each pre-computed path identifies a collection of channels in a series of links that connect the end-point nodes (and any intermediate nodes) so as to bypass traffic around the link having the failed working channel. The pre-computed path information is typically pre-stored in the end-point nodes to enable the end-point nodes to effect rapid restoration in the event localized restoration in not achievable.

23 Claims, 5 Drawing Sheets

PATH-BASED RESTORATION MESH NETWORKS

TECHNICAL FIELD

This invention relates to a technique for restoring service in a mesh network upon the failure of path.

BACKGROUND ART

Manufacturers of optical transport systems now offer an ever-increasing amount of available capacity on individual optical fibers. For this reason, achieving fast self-healing in a network from an accidental failure is of paramount importance. Presently, SONET/SDH ring networks comprise the most common type of self-healing network design. While SONET/SDH ring networks offer quick restoration and are easy to implement, such ring networks are not cost effective for many applications. For example, a highly connected network with most of the nodes each having at least three links requires more spare capacity when designed in a ring configuration than a comparable design with mesh configuration in which spare capacity is shared by the entire network more efficiently.

While mesh networks achieve more efficient use of spare capacity, restoration in a mesh network is more complex and slower than in a ring network. One type of mesh network restoration scheme is Link-Based Restoration (LBR) in which failed traffic is restored between the two nodes adjacent to the failure location regardless of the originating and terminating nodes of the failed signals. Another mesh restoration scheme is Path-Based Restoration (PBR) in which failed traffic is restored between the pairs of nodes where the failed signals originate and terminate regardless of the failure location. PBR requires less spare capacity to effect restoration as compared to LBR. On the other hand, PBR algorithms for establishing alternate paths when a failure occurs are more complex and therefore PBR may be slower, as compared to LBR.

Utilizing pre-computed routes can increase the PBR speed. One proposed restoration path computation approach employs node and link disjoint restoration paths. link- and node-disjoint restoration path is a path (i.e., a collection of individual channels in a series of links, each coupling a pair of nodes) that does not share any link or any intermediate node with the original path. However, accomplishing PBR using node-and link-disjoint restoration paths is inefficient in terms of maintaining sufficient spare capacity. On the other hand, it is necessary to determine which of the links on the signal path failed in order to implement a PBR method using unrestricted restoration paths. It is often problematic to make such a determination at the endpoint nodes. Further, computing a restoration path that is distinct from other restoration paths when multiple paths fail simultaneously is often not fast.

Thus, there is a need for a restoration technique that is not restricted to link-and node-disjoint paths, thus making the most efficient use of spare capacity. Additionally, there is a need for a mesh network restoration technique that affords restoration speeds comparable to those achieved in SONET/SDH rings. Further, there is a need for a mesh network restoration technique that is self-healing and self-managing.

BRIEF SUMMARY OF THE INVENTION

Briefly, the invention comprises a method for restoring service in a mesh network formed of a plurality of nodes, at least two of which serve as end points for originating and/or terminating traffic. A plurality of links, each having one or more working channels and one or more restoration channels, selectively couple pairs of the nodes. The collection of connected channels in a series of links carrying traffic between a pair of end-point nodes comprises a path. In accordance with the invention, at least one of a pair of connected nodes monitor the channels in connected links to detect a link in failure, that is, a link having at least one failed channel carrying traffic. Upon detecting a link in failure, one node determines whether the link in failure includes at least one available channel (typically, a restoration channel) to carry the traffic unable to pass on the failed channel. If so, the one node signals the node at the other end of the link in failure to route traffic on the available channel in the link, thus achieving "localized" restoration in a timely fashion.

Unfortunately, not all links may possess an available channel. (Indeed, a multiple-channel link, when severed, will suffer a failure of all its channels.) In the event that a link in failure lacks available restoration capacity (i.e., one or more available channels), then the nodes, which detected the failure, alert the path end-point nodes to restore the failed paths. Each end-point node accesses a database storing a plurality of pre-computed paths corresponding to the failed path. Each pre-computed path corresponds to a pre-selected link and identifies, for an associated pair of end-point nodes coupled by a path having a link in failure, an alternate path that bypasses the link in failure. After accessing the database, each end-point node selects the alternate path corresponding to the link in failure. The end-point nodes then route traffic in accordance with the pre-computed alternate path information to restore the network.

DETAIL DESCRIPTION

Figure 1:
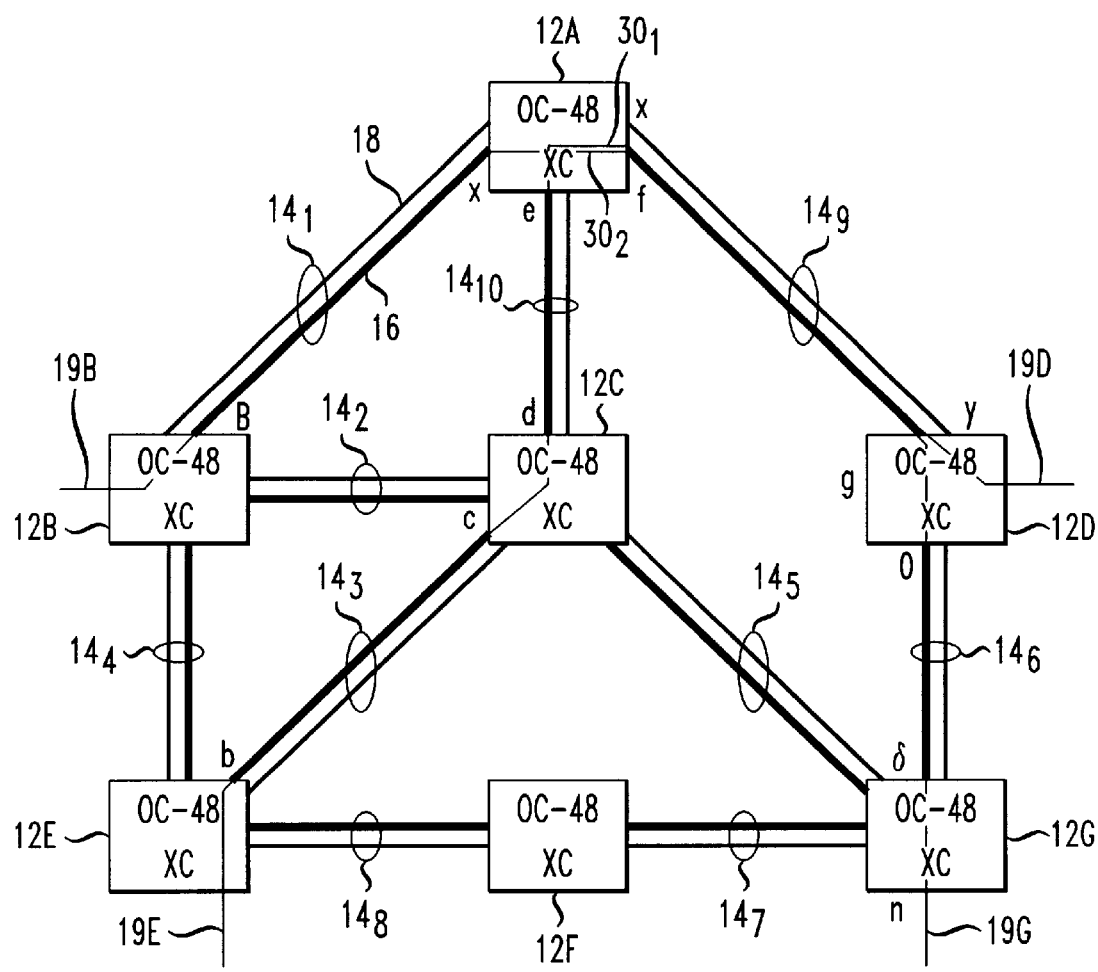
FIG. 1 depicts a block schematic diagram of an exemplary mesh network.

FIG. 1 depicts an exemplary mesh network 10 of the type commonly employed for transporting telecommunications traffic. The network 10 comprises a plurality of nodes 12A, 12B, 12C, 12D, 12E, 12F and 12G, pairs of which are coupled linked by optical fiber links $14_1$–$14_{10}$ as indicated in Table I below.

| LINKS | NODE PAIRS |
| --- | --- |
| $14_1$ | 12A, 12B |
| $14_2$ | 12B, 12C |
| $14_3$ | 12C, 12E |
| $14_4$ | 12B, 12E |

-continued

| LINKS | NODE PAIRS |
|---|---|
| $14_5$ | 12C, 12G |
| $14_6$ | 12D, 12G |
| $14_7$ | 12F, 12G |
| $14_8$ | 12E, 12F |
| $14_9$ | 12A, 12D |
| $14_{10}$ | 12A, 12C |

Each of links $14_1$–$14_{10}$ comprises at least one, and preferably, a plurality of bi-directional working channels 16 and at least one bi-directional restoration channel 18. In practice, each of the channels 16 and 18 carries traffic at an OC 48 rate, although the channels 16 and 18 could have higher or lower rates without departing from the teachings of the invention. Each of the nodes 12A–12G typically comprises a Digital Cross-Connect System (DCS) that possesses the ability to cross connect traffic received on one link to one or more other links. Such DCSs are well known and are available from a variety of manufacturers, including Lucent Technologies, and Alcatel. The working channels 16 may include multiple channels multiplexed by Wavelength Division Multiplex (WDM) Systems to carry all bi-directional channels over a single pair of fibers. Since the WDM systems are transparent to the transport of signals and are not involved in the restoration, they are not shown.

In the exemplary embodiment illustrated in FIG. 1, nodes 12D and 12E serve as end-point nodes at which particular traffic enters and/or exits the network 10 at each node ports 19D and 19E, respectively. Thus, for example, traffic entering the network at node 12E at port 19E can pass via channel bc in link $14_3$ to node 12C for routing therefrom via channel de in link $14_{10}$ to node 12A and then pass via channel fg in link $14_9$ to node 12D to exit the network at port 19D. The set of channels in links $14_3$, $14_{10}$ and $14_9$ coupling the end-point node ports 19E and 19D in nodes 12E and 12D, respectively, comprises a "path." This working path is shown in FIG. 1 as Path $30_1$. Another exemplary path comprises channel βx in link $14_1$, channel δε in link $14_9$, channel φγ in link $14_6$ coupling the end-point node ports 19B and 19G. This working path is shown as Path $30_2$.

Alternatively, traffic received at node 12E at port 19E and destined for node 12D for exit at port 19D passes between such nodes on an alternate path comprising a channel in each of the links $14_6$, $14_7$ and $14_8$ when connected on demand.

Figure 2:
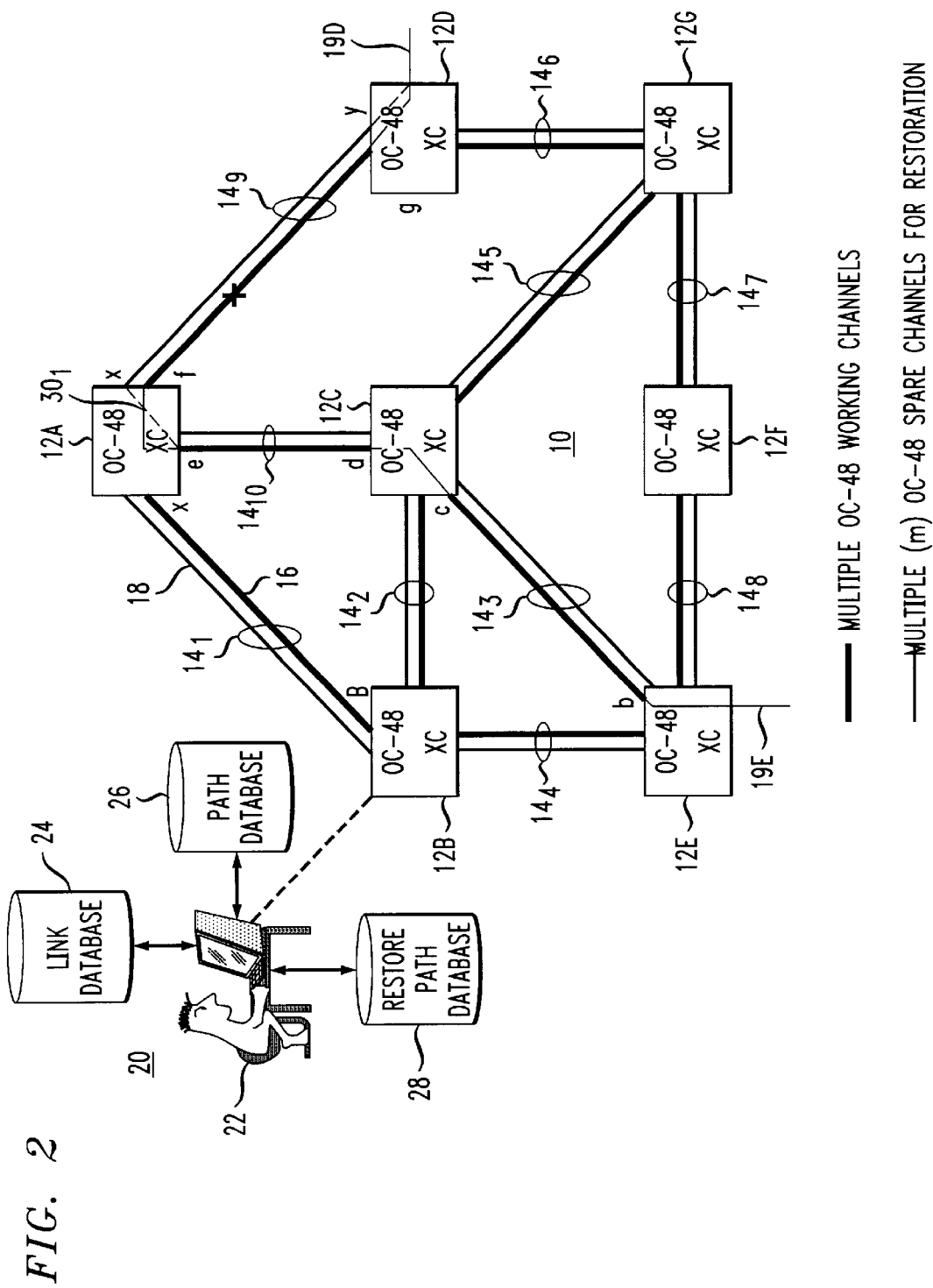
FIG. 2 depicts localized restoration of a single channel within the network of FIG. 1 in accordance with an aspect of the present invention.

FIG. 2 illustrates the network 10 of FIG. 1 configured with a Restoration Path Computing System (RPCS) 20 in accordance with the invention for effecting the computation of restoration paths in the network. The RPCS 20 includes a computing platform 22 in the form of a computer or the like Each of the nodes 12A–12G monitors the links $14_1$–$14_{10}$ to detect a link in failure. A link in failure is a link having one or more failed channels 16 and 18. The RPCS 20 creates and maintains a Link database 24 and a working Path database 26. The Link database 24 contains information about each of the links $14_1$–$14_{10}$, including: (1) the Link Identification (LID) that typically includes the identity of the nodes to which the link is coupled, (2) Working channel within the link requiring restoration upon failure (WCR), (3) Working channel within the link not requiring restoration upon failure (WCN), (4) Spare restoration channel (SPC) within the link for use in restoring a failed working channel and (5) Not used channel (NUC) within the link. A working channel assigned either as a WCR or WCN must be connected to another OC-48 channel dropping at the same node or to another working channel running towards another node. A channel assigned as a SPC is typically not connected to another channel via the node. Normally, an idle signal is inserted in a SPC. A NUC is usable in the same way as a WCN but may not be connected to any other node. Neither a WCN nor NUJC participates in restoration.

The Path database 26 includes records containing information about each path, that is, the collection of channels in links that couple ports in one end-point node to another, such as nodes 19E in 12E and 19D in 12D for Path $30_1$ in FIG. 2. In practice, each path record contains a Path Identification (PID) that can include an identifying port number on each node (not shown) coupled to a link end. In addition, each path record in the database 26 includes a priority for each path that can be computed if no service priority exists, or can be assigned in accordance with a service priority. The RPCS 20 typically updates the path database 26 following any change in the network 10, such as set up or removal of a path or unavailability of a restoration channel.

The RPCS 20 utilizes the information in the Link database 24 and the path database 26 to compute alternate restoration paths between end-point nodes for downloading to such nodes as described hereinafter. Optionally, the RPCS 20 can store information about such restoration paths in a restoration path database 28 so that when any update is made, the RPCS need only send the incremental update information to the nodes. For each working path and for each link that could fail in the working path $30_1$ between end-point nodes, the RPCS 20 computes a restoration path. Thus, for example, the RPCS 20 computes a restoration path between the end-point nodes 12E and 12D assuming a failure in the link $14_3$. Similarly, the RPCS 20 also computes a restoration path between the end-point nodes 12E and 12D assuming a failure of the link $14_{10}$ and another restoration path assuming a failure in of the Link $14_9$. These restoration paths may have common channels, and in some cases may be identical. As discussed hereinafter the RPCS 20 will download the pre-computed restoration path information to the end-point nodes whenever the RPCS updates its restoration path database 28 to facilitate restoration.

The RPCS 20 computes the restoration paths in the following manner. First, the RPCS 20 creates a temporary list of all available restoration channels 18 in the network 10. For each of the links $14_i$ (where i in an integer $\leq 10$), the RPCS 20 establishes a working path ($P_i$) for each of the n (where n is an integer) working path channels in a link $14_i$ that requires restoration according to the restoration priority. Suppose that the restoration priority decreases with increasing channel number. To that end, the RPCS 20 creates a set ($R_i$) of channels. The channel set $R_i$ consists of all available restoration channels in the entire network except the ones in link $14_i$ and all the channels in path $P_i$ except the one in link $14_i$.

The RPCS 20 can use a number of computation methods to compute a restoration path from the channels in the set $R_i$. For example, restoration path computation could be based on the shortest path. For example, the RPCS 20 would consider a channel (say channel 1) in the link $14_i$ and then determine the path ($P_i$) in which the selected channel belongs. The path terminating nodes for $P_i$ are $A_i$ and $Z_i$. The RPCS 20 then computes the shortest path ($P_{ir}$) between the terminating nodes $A_i$ and $Z_i$ from the restoration channel set $R_i$ A number of shortest path algorithms exist and any such algorithm can be used to compute the shortest path. For example, Dijkstra's shortest path algorithm for a sparsely connected or an all pair shortest path algorithm using dynamic programming for a densely connected network can be used to compute shortest paths efficiently. The shortest path criteria can be defined by mileage of the links on the path, number of nodes traversed by the path, a weighted sum of these two, etc. The path information ($P_{ir}$) is then sent to the corresponding terminating nodes $A_i$ and $Z_i$. Note that restoration path ($P_{ir}$) may have some common channels with the path $P_i$.

If no path is found, the RPCS 20 computes a shortest path, assuming that there are sufficient channels in all links as needed. The RPCS 20 then compares the actual available channels in the links and informs an appropriate Operations Systems (OS) (not shown) that no restoration path is found and which links need to be augmented with the necessary number of channels so a restoration path can be found. This information can be used to add restoration channels in appropriate links.

Next, the RPCS 20 proceeds to the second step and then begins the restoration path computation for the next highest priority path $P_j$ that includes a second channel of the WCR type (channel 2) in link 14$_i$. When the restoration path for channel i in link 14$_i$ is completed, the restoration channel set $R_i$ is updated by: (a) removing the channels already used by path $P_{ir}$, (b) removing all the channels of Path i and (c) adding all working channels of Path j except the one in link 14$_i$. The RPCS 20 then computes the shortest restoration path $P_{jr}$ from the updated path set $R_i$ and stores that information in the Restoration Path database 28. The information about path $P_{jr}$ is downloaded under the command of the RPCS 20 to the terminating Nodes $A_j$ and $Z_j$ corresponding to Path $P_j$.

The process of computing the restoration path for the second channel in the link 14$_i$ is repeated for the each of the remaining channels of WCR type in the same link. Thereafter, the RPCS 20 considers the next link and completes the previously discussed procedure for each link. The RPCS 20 computes the restoration paths for each link and restoration paths are obtained for all links. When a new channel is established for service or for restoration, restoration paths are re-computed and downloaded to the appropriate nodes.

Since the procedure described above determines additional channels in specific links needed for restoration of each path, the procedure can also be used to compute restoration capacity required for restoration of all paths in the network. A specific approach to determine restoration capacity would be the following. First, assume that there is an infinite number of SPCs available for each link. Then, the RPCS 20 computes restoration paths for each link failure using either a shortest path algorithm or another suitable algorithm. The set of used SPCs then constitute the spare capacity needed for the network. This set, of course, may not be sufficient to restore traffic for a node failure. The set can be extended by including the restoration paths for node failures as well.

The network 10 accomplishes restoration of the affected traffic upon a link in failure in three phases. First, the network attempts "localized" restoration by seeking to route traffic on a restoration channel 18 within the link in failure comprising part of the existing path when such a channel is available in the failed link. If no restoration channel is available, then the network attempts to route the traffic on restoration path that excludes the link in failure in the second phase using "Path based Automatic Restoration Switching (ARS-P)." If restoration is unsuccessful for some channels after the second phase because of multiple failures or node failure then RPCS 20 takes control to restore remaining channels in the third phase The manner in which localized restoration is effected may best be understood by reference to FIG. 2. Upon the failure of a working channel in link 14$_9$ between the nodes 12A and 12D, the nodes 12A and 12D detect the failed channel because of a Loss of Signal (LOS), Loss of Frame (LOF) or Signal Degrade (SD). Upon detecting a failed channel, the nodes 12A and 12D communicate this event, typically via overhead bytes in the traffic signals as will be discussed below. The communication, however, can be accomplished via external communication channels established between nodes. The transmitted information includes the identity of the failed link, type of failure, the Path Identification (PID), and the target Node Identification (NID), that is, the identification of the end-point node.

Upon receipt at the node 12A of an indication of a failure in the link 14$_9$, the node 12A inserts a standard path alarm indication signal (AIS-P) on a still-working segment of the path for receipt at the end point node 12E at which the traffic terminates. Then, Node 12A checks for the availability of a restoration channel 18 on the link 14$_9$. Should an available restoration channel exist, then the Node 12A accomplishes automatic restoration on that existing channel and node 12D does likewise. In the event that no available capacity exists on the link 14$_9$, then nodes 12A inform node 12E which, in turn utilizes a pre-computed restoration path, as does node 12D, to restore service.

Table II below lists the localized restoration protocol in case of a failure of a channel in the link 14$_9$.

| Failure Condition | Automatic Restoration 12A>12A | Automatic Restoration 12A | Action at Node 12D | Action at Node |
|---|---|---|---|---|
| No failure | No restoration request in any restoration channel Null channel ID in the restoration channel(s) 18 | No restoration request in any restoration channel Null channel ID in the restoration channel(s) 18 | Idle Signal to all restoration channels. | Idle Signal to all restoration channels. |
| OC 48 WCR-1 (link 14$_9$) failed | Request Node 12D to bridge WCR-1 toSPC-1 in link 14$_9$. Set channel ID in link 14$_9$ as WCR-1 | No request. Null channel ID in restoration channel 18 in link 14$_9$ | Failure detected. Node 12A sends bridge request to node 12D | |
| | Above request continues. | Reverse request for WCR-1 bridge via the link 14$_9$. The channel in link 14$_9$ | Above message continues. | Bridge WCR-1 to SP-1 and reverse request to bridge to node 12A. |

-continued

| Failure Condition | Automatic Restoration 12A>12A | Automatic Restoration 12A | Action at Node 12D | Action at Node |
|---|---|---|---|---|
| | | now becomes WCR-1 and the bridged channel ID in link $14_9$ now becomes WCR- 1 | | Indicate that WCR-1 is bridged. |
| | Switch request continues. Indicate WCR-1 is bridged to the restoration channel 18 in link $14_9$. | Above message continues | Select WCR-1 in link $14_9$ (i.e., remove the failed channel) and make connection to restoration channel through the node 12A. Bridge WCR-1 to SP-1. | |
| | Above message continues. | Above message continues | Above message continues. | Select SP-1 for WCR-1 Bi-directional restoration completed in the same span |
| Failure Repaired Wait-to-restore expires | Wait-to-restore for WCR-1 code in SP-1 | The reverse bridge request continues. | The above setup | |
| | No request | The reverse bridge request continues. | Release Channel 1 selection. Insert No request | |
| | No request | No request | | Release WCR 1 bridge. Release Channel 1 Selection |

While the above-described localized restoration process is similar to the conventional 1 :n bi-directional SONET APS protocol, there are several major differences. First, the localized restoration process of the invention dynamically creates a protection boundary between the egress points of signals in an OC-48 system. Further, the localized restoration process of the invention requires no dedicated channels as are required in the SONET APS protocol. Additionally, the localized restoration scheme of the invention accomplishes selection at a node exit point, not at the receiving point closest the failure location. Thirdly, the present technique accommodates more than fourteen channels, the maximum limit of the SONET APS protocol.

Figure 3:
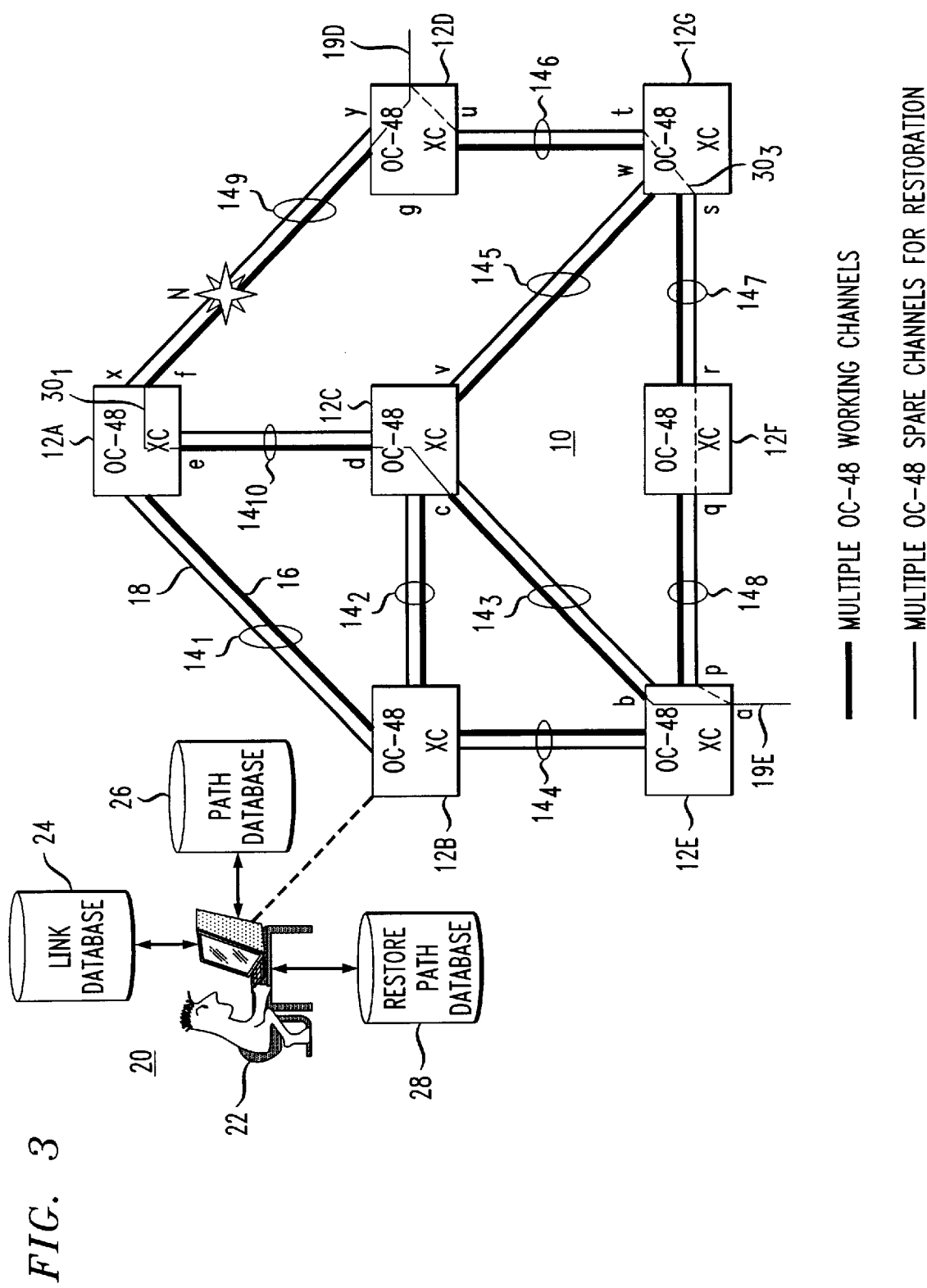
FIG. 3 depicts path restoration on a link-disjoint path within the network of FIG. 1 in accordance with another aspect of the invention.

As discussed, the failure detecting nodes in Network 10 attempt localized restoration first when a link is in failure. However, in some instances, the failure detecting nodes cannot effect localized restoration. Referring to FIG. 3, should the entire link $14_9$ become severed, then no restoration channel 18 is available. Under such circumstances, the node 12A sends a restoration code for Path $30_1$ towards node 12C for ultimate receipt at node 12E, which, in response assigns itself as the restoration switching node. Likewise, node 12D being the end point of the failed path $30_1$ assigns itself as the other restoration switching node. The nodes 12E and 12D then effect restoration by a previously computed and downloaded path from RPCS 20.

In the event of an inability to locally restore traffic on the link $14_9$, the nodes 12E and 12D must switch traffic. Thus, for example, if the node 12E and 12D had previously routed a traffic via a path comprising the links $14_3$, $14_{10}$ and $14_9$, now node 12E and 12D must route traffic over a restoration path that, in the illustrated embodiment, comprises restoration channel pq in link $14_8$, restoration channel rs in link $14_7$ and restoration channel tu in link $14_6$. In particular, the node 12E bridges the traffic that previously passed on the link $14_3$ to the restoration channel pq in the link $14_8$ while the node 12F connects that traffic received in channel pq on the link $14_8$ onto the restoration channel rs in the link $14_7$. The node 12G likewise connects the traffic now received from the restoration channel rs on the link $14_7$ onto the restoration channel tu on the link $14_6$. Lastly, the node 12D switches it's output port 19D from the now-failed link $14_9$ to traffic-carrying restoration channel tu in the link $14_6$. The Node 12D completes a like path in the reverse direction.

Figure 4:
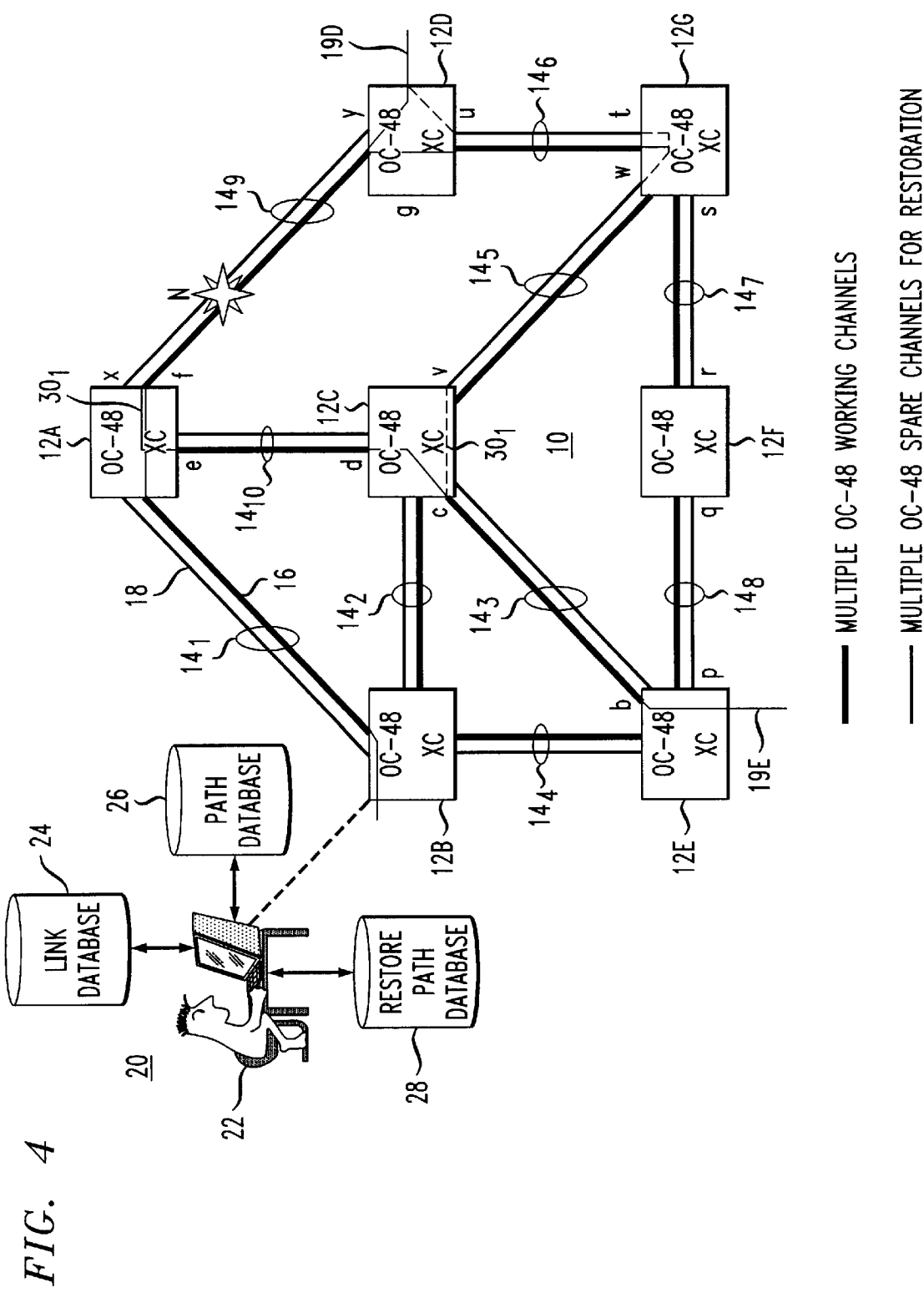
FIG. 4 depicts path restoration on a non-disjoint path within the network of FIG. 1 in accordance with the invention.

The restoration path depicted in FIG. 3 is link and path disjoint. In other words, the original traffic-bearing path comprised of the links $14_3$, $14_{10}$ and $14_9$ share no common nodes or links with the restoration path comprised of the links $14_8$, $14_7$ and $14_6$, other than the end-point nodes 12E and 12D. If restoration were restricted to only to link and disjoint paths, the potential capacity savings achievable in the mesh network 10 would disappear. Advantageously, the restoration method of the invention is not restricted to link and disjoint paths. As seen in FIG. 4, the pre-computed restoration path downloaded from the RPCS 20 to the nodes 12E and 12D could comprise the working path channel bc on link $14_3$, restoration channel vw on the link $14_5$, and restoration channel tu on link $14_6$. Note that link $14_3$ comprises part of the original path, thus obviating the need for any bridging at node 12E. However, node 12C must bridge the traffic received on the channel bc on link $14_3$ to the restoration channel vw of the link $14_5$ to effect restoration.

To effectuate automatic restoration switch in accordance with the method of the invention, the following connection rules apply Rule-1. A node originating the Automatic Restoration Switching-Path (ARS-P) bridges the path to the restoration channel if that channel is different from the original working channel and sends the ARS-P code over the working channel if that is on the restoration path without any bridging action.

Rule-2. An intermediate node receiving ARS-P request from a working channel passes through the request when the outgoing restoration channel is also a part of the original working path (WCR to WCR).

Rule-3. An intermediate node receiving ARS-P request from a working channel bridges the incoming channel to the outgoing channel when the outgoing channel is not part of the original working path (WCR to SPC).

Rule-4. An intermediate node receiving the ARS-P request from a restoration channel connects the incoming channel to another outgoing restoration channel when none of the channels are part of the working path (SPC to SPC).

Using the above rules, restoration of two or more paths can occur simultaneously without conflict. In this way, the restoration technique of the invention can achieve fast restoration, comparable to speeds achieved in SONET/SDH rings.

Upon repair of a failed channel in a link, the nodes coupled to that link now receive valid signals because either the path terminating node or the bridging node did not remove the original connection. When a node receives a valid signal, it checks the Path ID to determine if the signal is valid. Upon receipt of a valid signal, the switching node inserts a Wait-to-revert (WTR) code in the channel of the restored path. After a prescribed WTR time expires after the code is received by the node at the other end of the path, the node at the other end of the path then reverts to the original path.

Figure 5:
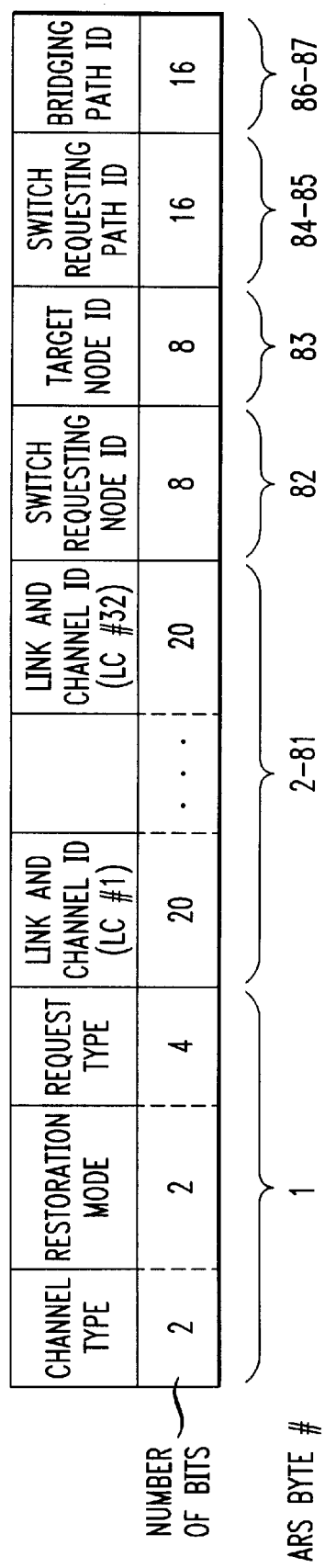
FIG. 5 is a block diagram of coding block for accomplishing automatic restoration in accordance with the invention.

Implementation of the restoration scheme of the invention requires not only pre-computation of the restoration paths as discussed previously but also require a communications protocol that enables simultaneous communication of restoration path information to the nodes. A particular implementation of the communication method in the restoration method of the invention employs eighty-seven bytes for the Automatic Restoration Switching (ARS) protocol. In a typical OC-48 signal, there are forty-seven bytes next to the K1 byte and another forty-seven bytes next to the K2 byte, thus providing sufficient capacity for the eight-seven bytes needed for restoration. The specific coding of the eight-seven bytes is depicted in FIG. 5 and listed in Table III below.

TABLE IIII

| Code Type | Bits | Code | Attribute | Notes |
|---|---|---|---|---|
| Channel Type | 2 | 00 | Not Used Ch (NUC) | This field is coded in all channels during provisioning and do not change |
|  |  | 01 | Wrkng Ch w/rest (WCR) |  |
|  |  | 10 | Wrkng Ch no rest (WCN) |  |
|  |  | 11 | Spare rest ch (SPC) |  |
| Restoration Mode | 2 | 00 | No request | ARS-L is used only in SPC, ARS-C Only in WCR and ARS-P in both SPC and WCR. |
|  |  | 01 | ARS-L |  |
|  |  | 10 | ARS-C (switch control) |  |
|  |  | 11 | ARS-P |  |
| Request type | 4 | 1111 | Lockout of restoration | Only an SPC can have Lockout. |
|  |  | 1110 | Forced restoration switch - Local |  |
|  |  | 1101 | Forced switch - Path | Using restoration path |
|  |  | 1100 | Signal fail - Local | Used for local restoration |

TABLE IIII-continued

| Code Type | Bits | Code | Attribute | Notes |
|---|---|---|---|---|
|  |  | 1011 | Signal Fail - Link | Used in ARS-P |
|  |  | 1010 | Signal Degrade - Restoration channel |  |
|  |  | 1001 | Signal Degrade - Local | Used for local restoration |
|  |  | 1000 | Signal degrade - Link | Used in ARS-P |
|  |  | 0111 | Manuals switch - Local | Using local channel |
|  |  | 0110 | Manuals switch - Link | Using restoration path |
|  |  | 0101 | Wait to revert |  |
|  |  | 0100 | Exercise - Local |  |
|  |  | 0011 | Exercise - Link |  |
|  |  | 0010 | Reverse request - Local | Used in ARS-L |
|  |  | 0001 | Reverse request - Link | Used in ARS-P |
|  |  | other | No request |  |
|  |  |  |  | This coding is used following the SONET/SDH APS standards. (ITU-T Recommendation G.841) |
| Switch Requesting Node ID | 8 | 0 | NULL | Assuming not more than 255 nodes in a network. Used in ARS-P for verification - not essential. |
|  |  | 1-255 (dec) | Nodes numbered through 1-255 |  |
| Target Node ID | 8 | 0 | NULL | Assuming no more than 255 nodes in the network this is the target Node ID to be used in ARS-P. It is not essential because the end node will not have any LC left in the LC fields. Desirable for speed. |
|  |  | 1-255 |  |  |
| Failed Path ID | 16 | 0 | NULL | Assuming all paths (less than 65535 in the network) are numbered. This is not essential but desirable for switch confirmation. Used in ARS-P. |
|  |  | 1-65535 (dec) | Path ID numbers |  |
| Bridged Path ID | 16 | 0 | NULL | Assuming all paths (less than 65535 in the network) are numbered. This is not essential but desirable for switch confirmation. Used in ARS-P |
|  |  | 1-65535 (dec) | Path ID numbers |  |
| Link & Ch ID #1 (LC 1) for a restoration path | 12 + 8 | All 0 | NULL | 12 bits are allocated assuming that there would be no more than 4095 links in the network and no more than 255 channels in a link. |
|  |  | 12 bits - Link #. 8 bits for Channel # in the link[1]. | All links numbered 1–4095 All channels in a link numbered 1–255 |  |
| LC #2 to #32 | 12 + 8 each | Same as in LC 1 | Same as in LC 1 | Assuming no more than 32 links on a restoration path the concatenation of the 32 LCs indicate the restoration path |

TABLE IIII-continued

| Code Type | Bits | Code | Attribute | Notes |
|---|---|---|---|---|
| | | | | to the nodes on that path and used in ARS-P. If less than 32 links on a restoration path rest of the LC fields is coded NULL. LC 1 and 2 are also used in ARS-L for switch-requesting and bridging channel IDs. |

[1] An alternative LC ID coding using 2 bytes: First 8 bits for NID at one end of the link and the next 8 bits for the NID for the node at the other end of the link.

The following steps demonstrate the execution of the above-protocol using the ARS bytes and the failure of a working channel in the link $14_9$ in both directions due to Loss Of Signal (LOS) as depicted in FIG. 2.

1. Both Nodes 12A and 12D detect LOS in a working channel fg of Path $30_1$, in the link $14_9$, Node 12A decides after examining the priority of other failed channels (if any) that it can use a restoration channel 18 in the same link to restore the failed working path $30_1$. Node 12A inserts a Path Alarm Indication Signal (AIS-P) in the outgoing direction of channel ed of Path $30_1$, on link $14_{10}$ and the node 12D inserts such a signal at its output port 19D in the outgoing direction. (The AIS-P signal comprises of "all 1s" in the entire payload including pointer bytes.) Other SOH (Section Overhead) bytes are normal i.e., the ARS bytes are coded for no request. Nodes 12A and 12D become the switching nodes and initiate Automatic Restoration Switching-Local (ARS-L) using the available restoration channel xy in the link $14_9$.

2. Node 12A sends bridge request code to the node 12D. Bridge request code in the switching state of the node is the failure indication coded in bits 5–8 of ARS Byte 1. The ARS-L code carried in the restoration channel xy in link $14_9$ includes a value 0–1 in bits 3 and 4 of ARS Byte 1 in channel xy, 1100 (for LOS Local) in bits 5–8 of Byte 1, link and channel Identifications (LC) for the failed channel gf in the link $14_9$ in the first 12 and last 8 bits of LC # 1 of the ARS bytes, respectively. LC #1 is used to carry the switch requesting link and channel identification in ARS-L. LC #2 is used to indicate the bridged link and channel IDs of the failed channel in the link $14_9$. The remaining ARS bytes are set to NULL. The same action is taken by node 12D in the opposite direction on the restoration channel yx of the link $14_9$.

3. Upon receiving the ARS-L code described in Step 2 on the restoration channel in the link $14_9$, node 12D, being the switching node, removes connection between the failed channel in the link $14_9$ to its output port 19D and makes connection between its output port to the restoration channel xy in the link $14_9$. Similarly, node 12A switches from the working channel in the link $14_{10}$ to the restoration channel in the link $14_9$ to complete the bi-directional switch. Note that if the failure is only in one direction, say from 12D to 12A, then 12D receives the same ARS-L code as in Step 2. However, Node 12D, not detecting any failure, does not yet become a switching node. Node 12D, upon receipt of the ARS-L code from Node 12A, bridges 1 9D to the restoration channel yx and sends Reverse Request in bits 1–4 of ARS byte 1 to Node 12A. Node 12A, upon receipt of the Reverse Request from Node 12D, executes a bridge of the channel de in link $14_{10}$ to the channel xy in link $14_9$ and a switch from the gf-ed channel connection to the yx-ed channel connection. Node 12A then sends bridged LC ID in LC #2 to Node 12D. Node 12D, upon receipt of the bridged channel code, executes a switch from the fg-19D connection to the xy-19D connection. Thus, a Bi-directional switch is completed by using Reverse Request code in case of a unidirectional failure.

4. Suppose that failed link $14_9$ does not have any SPC on the same link either because other higher priority channels captured available SPCs or no SPC available due to the failure of the entire link. Nodes 12A and 12D begin the ARS-P phase of the PBR protocol of the invention. Node 12A inserts an 10 code (Switch Control Request ARS-C) in Restoration Mode bits 3 and 4 of the ARS Byte 1 to indicate to node 12E that it needs to take control to switch the failed path. Request type bits (5–8 of ARS byte 1) indicate the failure type such as LOS with 1011 (Signal Fail-Link). LC # 1 (20 bits) indicate the link number of the failed channel (12 bits) and the channel number (8 bits) in the link. Remaining 31 LCs and other bytes are set to NULL.

5. Node 12C receives the ARS-C code and determines that it is not the path terminating point for the failed path $30_1$, and passes the ARS-C code to Node 12E.

6. Node 12E receives the ARS-C code from the working channel cb of the failed path $30_1$, on the link $14_3$ and determines that the node must take control for switching the failed path $30_1$. Looking at LC #1, node 12E determines which link failed. Then node 12E examines the restoration path for the path $30_1$, corresponding to the link $14_9$ in failure. Suppose that the restoration path is $30_3$ as shown in FIG. 3 comprising restoration channels pq, rs, and ut in the links $14_8$, $14_7$ and $14_6$, respectively. The node 12E now becomes a switching node. The node 12E inserts "11 " in restoration Mode bits of ARS Byte 1 of the restoration channel pq in link $14_8$ to indicate path switch mode to the other end Node 12D. The request Type bits are set to the received value from working channel in the link $14_3$ to indicate the request type. LC #1 is coded with the Link and Channel ID for the restoration channel in the link $14_8$, LC # 2 for the restoration channel in the link $14_7$ and LC #3 for the restoration channel in the link $14_6$ to indicate to the nodes on the restoration path to make appropriate connections. Node 12E inserts the Node ID for node 12D in the Target Node ID byte, its own ID in the originating Node ID byte, the failed Path ID in the requesting Path ID and the bridged path ID in Bridging Path ID locations of ARS bytes. Note that Switch requesting Path ID and bridging Path ID bytes are identical in this case.

7. Node 12F receives the code from the restoration channel pq in the link $14_8$ and the node determines from the Restoration Mode that it needs to look at the first two channels and connect them from LC #1 to LC #2. In this case, it connects the restoration channel pq in the link $14_8$ to the restoration channel rs in the link $14_7$. Then, the node 12F shifts all the LC codes one unit to the left. In other words, LC #1 code is removed, LC #2 is written in LC #1, LC #3 code is written in LC #2 and LC # 3 is set to NULL.

8. The node 12G receives the ARS-P switch request code on the restoration channel rs in the link $14_7$ and the node repeats the step in 7.

9. The node 12D receives the switch request code from the restoration channel tu in the link $14_6$ and now examines at LC #1 and 2 as in Step 7,and determines that the restoration path 30₃ ends at the node. The Node 12D can further verify that it is the end node by looking at the Target Node ID. The node 12D after verifying that the working path 30₁ is the requesting path to be restored path 30₃ from the other end 12E executes a bridge and switch function. In the switch function, the node 12D removes the connection to its output 19D to the working channel in the failed link 14₉ and makes the connection to the restoration channel tu in the link 14₆, thus completing the switch in the direction of node 12E to 12D. In the bridge function, the node 12D connects port 19D to channel ut in link 14₆ without removing 19D-gf connection. If the failure is in both directions on the working channel of the link 14₉, then node 12E would similarly switch the connection between its output port 19E from the working channel in the link 14₃ to the restoration channel qp in the link 14₈ in response to a request by node 12D. On the other hand, if the failure was only in the direction from node 12D to node 12A, the node 12E would insert bridge request code in that restoration channel as described in Step 3. The node 12D, upon receipt of the bridge request from Node 12E, becomes a switching node. Node 12D then executes a bridge of 19D to restoration channel ut and inserts Reverse Request code in the restoration channel ut and bridged signal indication in LC #2. Node 12E, upon receipt of the Reverse Request from node 12D, executes a bridge of 19E to the restoration channel pq and a switch from cb-19D connection to qp-19D connection. This completes the bi-directional switch whether the failure is unidirectional or bi-directional.

10. Steps 1 through 9 are followed to restore other paths failed at the same time without any conflict because there is no common channel between the restoration paths as computed beforehand.

11. When failed working channel in the link 14₉ is repaired, Node 12A and Node 12C receive valid signal with No Request (NR) code in ARS. Node 12C passes through the NR code to Node 12E. After receiving NR from WCR cb in link 14₃, the node 12E then inserts Wait-to-restore (WTR) in bits 5–8 of the ARS Byte 1 which is passed through by Nodes 12F and 12G to Node 12D. Node 12D, upon receipt of the WTR waits for a predetermined WIR period and then reverts to the original connection, i.e., releases the tu-19D connection and makes fg-19D connection. Similarly Node 12E, upon receipt of WTR and waiting for a predetermined WTR period reverts to the original path. If the original failure was unidirectional, say 12D–12E direction, then the node 12E sends WTR to node 12D when the failure clears. Node 12D, upon receipt of the WTR code from node 12E, inserts WTR in the reverse direction, waits for a pre-determined WTR period and then executes a switch back to the original path 30,by disconnecting tu-19D and connecting fg-19D. Node 12E, upon receipt of WTR from node 12D, waits for a pre-determined WTR period and then executes a switch back to the original path 30₁ by disconnecting qp-19E and connecting cb-19D. That completes the bi-directional switch after a unidirectional failure is repaired. Nodes 12D and 12E may check PID before switching for further verification. Upon execution of the switch back function, nodes 12D and 12E insert No Request code in the channels of Path 30₃. The node 12F, upon receiving the NR code from node 12E releases the connections of the restoration channels from the links 14₇ to 14₈ and pass through the NR code to the node 12G. Node 12G, likewise, releases the connection from restoration channel in 14₆ to the restoration channel in 14₇ and then passes through the NR code to Node 12D. Node 12D, upon receipt of NR code from Node 12E, releases the bridge 19D-ut. Similar action is taken in the other direction. All channels then return to the normal state.

12. After the steps 1–10 are executed, some or all of the channels may not be restored if the failure in the network 10 was due to a node failure or there was more than one link failure. The paths that are not restored or a predetermined time expires before the restoration can be completed, the path end-point nodes communicate to the RPCS 20 that one or more paths could not be restored. The RPCS 20 then initiates the third phase of the restoration. All nodes, when they detect a failure, send the failure information to the RPCS 20. From this information, the RPCS 20 determines that there is a node failure or there is more than one link failure. The RPCS 20 computes yet another set of restoration paths based on the unavailability of restoration channels in multiple links or all links through the failed node. The RPCS 20 then downloads the new restoration path information to the end-point nodes of the failed paths and commands these nodes to initiate restoration. The steps 1 through 10 are re-executed with these new restoration paths to enable the end-point nodes to restore the remaining paths that were not restored in the first two phases. Return to normal state is accomplished in the same manner as described in Step 11.

The above-described restoration method of the invention affords rapid restoration. By using SONET-like layer protocols, the nodes can detect failures in less that 10 milliseconds, the same as in a SONET/SDH ring network. For localized restoration, the total time required for the nodes to determine the available restoration channels and communicate that information amongst themselves is of the order of 20–30 milliseconds and the complete switching time including that of detection is less than 60 milliseconds. Alternate Restoration Switching-Path (ARS-P), in accordance with the second phase of the restoration method of the invention takes somewhat longer, due to the need to first determine the inability to achieve localized restoration. Also, a small amount of time will be consumed to determine the appropriate restoration paths at the end-point nodes, to communicate between the end-point nodes through intermediate nodes on the restoration path using the ARS-P protocol and to execute the switching at the intermediate nodes. Even for the ARS-P, a restoration of 100–300 milliseconds is possible.

The foregoing describes a technique for achieving rapid path-based restoration in a mesh network.

It is to be understood that the above-described embodiments are merely illustrative of the principles of the invention. Various modifications and changes may be made thereto by those skilled in the art, which will embody the principles of the invention and fall within the spirit and scope thereof.

What is claimed is:

1. A method for restoring service in a mesh network formed of a plurality of nodes at least two of which serve as end points for traffic traversing the network, the nodes connected to each other by links, each link having at least one working channel for carrying traffic between a pair of nodes and a restoration channel, and each pair of end-point nodes connected through a working path by connecting a set of channels in a series of links, the method comprising the steps of:

(a) monitoring each link to detect a failure of a working channel and, upon detecting a failure, (b) determining if said each link with a failed working channel has at least one available restoration channel able to carry traffic, and if so, then routing traffic on said available restoration channel; but if no restoration channel is available in said each link with the failed working channel, then restoring traffic by the steps of
(1) checking the availability of, and selecting a restoration channel in the same link according to a pre-determined priority of failed channels;
(2) sending a request from a first node connected at a first end of the link having a failed channel to a second node at an opposite end over the available channel to verify that said available channel is to be used for routing failed traffic in both directions;
(3) effecting a switching operation at each of the first and second nodes to switch traffic from the failed channel to the available restoration channel, then
(c) implementing, at each pair of end-point nodes linked by said working path having the failed channel in a link in said path, a pre-computed path associated with said link having said failed channel, said pre-computed path associated with said link and identifying a collection of restoration channels in pre-selected links that collectively provide a route between said pair of end-point nodes, and
(d) routing traffic in said network over said pre-computed path between each said pair of end-point nodes that would otherwise pass traffic over the link having the failed working channel.

2. The method according to claim 1 wherein the routing step includes the steps of:
identifying the pre-computed path to each pair of end-point nodes that would otherwise pass traffic over the link having the failed working channel; and
effecting switching of traffic onto the pre-computed path.

3. The method according to claim 1 wherein the monitoring step includes the steps of:
monitoring each link for a restoration trigger including Loss of Signal, Loss of Frame and Signal Degrade and
communicating that condition to each node connected to said each link.

4. The method according to claim 1 wherein the step of routing traffic over the pre-computed path comprises the steps of:
originating a request to effect automatic switching at a first endpoint node to route traffic on an available restoration channel able to carry traffic;
passing the automatic switching request from the first end-point node to a first intermediate node that receives the request on a working channel in the pre-computed path and thereafter passes the request without action to a subsequent node when the restoration channel identified by the pre-computed path is a channel of an original path traversing that first intermediate node; otherwise,
bridging, at the first intermediate node, an incoming channel to an outgoing channel in response to a request on the working channel when the outgoing channel is not a part of the original path; but
connecting an incoming channel at an intermediate node to an outgoing restoration channel in response to a request on a restoration channel when no channel is part of the original path.

5. The restoration method according to claim 4 further including the steps of:

(a) determining, after implementation of each pre-computed path, whether there exist any paths in failure, and if so;
(b) communicating to a restoration path control system, the paths still in failure;
(c) determining if the cause of the paths still in failure is a node failure, and if not then if the cause is multiple links in failure;
(d) determining additional pre-computed paths or computing additional restoration paths avoiding failed links and nodes, each corresponding to a node in failure or multiple links in failure;
(e) downloading said additional paths to each pair of end point nodes whose connecting path contains a link still in failure; and
(f) effecting a routing operation on the said additional paths.

6. The method according to claim 1 further including the steps of:
(a) determining when a failed working channel on a link is returned to service; and
(b) switching traffic back onto the link returned to service.

7. The method according to claim 1 wherein each pre-computed path is determined by the method comprising the steps of:
(a) determining a set of all available restoration channels except those in a successive one of the links and
(b) establishing the pre-computed path P for a successive one of n working channels in a successive one of the links from a collection of available restoration channels, which yields a shortest path between said two end-point bypassing said successive working channel in said successive link;
(c) removing from the set of available restoration channels the channels comprising said pre-computed path for said successive working channel in said successive link;
(d) establishing a pre-computed path for a next successive one of n working channels in a successive one of the links from a collection of available restoration channels, which yields a shortest path between said two end-point bypassing said next successive working channel in said successive link;
(e) removing from the set of available restoration channels the channels comprising said pre-computed path for said next one successive working channel in said successive link;
(f) repeating steps (d) and (e) for each next successive working channel in said successive link until pre-computed paths are established for all the working channels in said successive link;
(g) repeating steps (b)–(f) for all of the links.

8. The method according to claim 7 wherein the originating request is communicated on an unused portion of an overhead data block in the traffic traversing the network.

9. A method for restoring service in a mesh network formed of a plurality of nodes at least two of which serve as end points for traffic traversing the network, the nodes connected to each other by links, each link having at least one working channel for carrying traffic between a pair of nodes and a restoration channel, and each pair of end-point nodes connected by a working path formed of at least one working channel in one link, the method comprising the steps of:
(a) monitoring each link to detect a failure of a working channel and, upon detecting a failure, (b) determining if said each link with a failed working channel has at least one available restoration channel able to carry traffic, and if so, then routing traffic on said available restoration channel; but if no restoration channel is available on said restoration channel in said each link with the failed working channel, then (c) implementing, at each pair of end-point nodes linked by said working path having the failed channel in a link in said path, a pre-computed path associated with said link having said failed channel, said pre-computed path associated with a said link and identifying a collection of restoration channels in pre-selected links that collectively provide a route between said pair of end-point nodes, and (d) routing traffic in said network over said pre-computed path between each said pair of end-point nodes that would otherwise pass traffic over the link having the failed working channel by the steps of:

(1) originating a request to effect automatic switching at a first end point node to route traffic on an available restoration channel able to carry traffic;

(2) passing the automatic switching request from the first endpoint node to a first intermediate node in the pre-computed path that receives the request on a working channel and thereafter passes the request without action to a subsequent node when the restoration channel identified by the pre-computed path is a path of an original path traversing that first intermediate node; otherwise, (3) bridging, at the first intermediate node an incoming channel to an outgoing channel in response to a request on the working channel when outgoing channel is not a part of the original path; but (4) connecting an incoming channel at an intermediate node to an outgoing restoration channel in response to a request on a restoration channel when no channel is part of the original path.

10. The method according to claim 9 wherein the routing step includes the steps of:

identifying the pre-computed path to each pair of end-point nodes that would otherwise pass traffic over the link having the failed working channel; and effecting switching of traffic onto the pre-computed path.

11. The method according to claim 9 wherein the monitoring step includes the steps of:

monitoring each link for a restoration trigger including Loss of Signal, Loss of Frame and Signal Degrade; and communicating that condition to each node connected to said each link.

12. The method according to claim 9 wherein the step of determining and routing on an available channel on the same link comprises the steps of:

(a) checking the availability of, and selecting a restoration channel in the same link according to a pre-determined priority of failed channels;

(b) sending a request from a first node connected to a first end of the link having a failed channel to a second node at an opposite end over the available channel to verify that same said available channel is to be used for routing failed traffic in both directions; and (c) effecting a switching operation at each of the first and second nodes to switch traffic from the failed channel to the available restoration channel.

13. The restoration method according to claim 9 further including the steps of:

(a) determining, after implementation of each pre-computed path, whether there exist any links in failure, and if so;

(b) communicating to a restoration path control system, the links still in failure;

(c) determining additional pre-computed paths, each corresponding to a link still in failure; and (d) downloading said additional pre-computed paths to each pair of end point nodes whose connecting path contains a link still in failure.

14. The method according to claim 9 further including the steps of:

(a) determining when a failed working channel on a link is returned to service; and (b) switching traffic back onto the link returned to service.

15. The method according to claim 9 wherein each pre-computed path is determined by the method comprising the steps of:

(a) determining a set of all available restoration channels except those in a successive one of the links and (b) establishing the pre-computed path P for a successive one of n working channels in a successive one of the links from a collection of available restoration channels, which yields a shortest path between said two end-point bypassing said successive working channel in said successive link;

(c) removing from the set of available restoration channels the channels comprising said pre-computed path for said successive working channel in said successive link;

(d) establishing a pre-computed path for a next successive one of n working channels in a successive one of the links from a collection of available restoration channels, which yields a shortest path between said two end-point bypassing said next successive working channel in said successive link;

(e) removing from the set of available restoration channels the channels comprising said pre-computed path for said next successive working channel in said successive link;

(f) repeating steps (d) and (e) for each next successive working channel in said successive link until pre-computed paths are established for all the working channels in said successive link;

(g) repeating steps (b)–(f) for all of the links.

16. The method according to claim 9 wherein the originating request is communicated on an unused portion of an overhead data block in the traffic traversing the network.

17. A method for restoring service in a mesh network formed of a plurality of nodes at least two of which serve as end points for traffic traversing the network, the nodes connected to each other by links, each link having at least one working channel for carrying traffic between a pair of nodes and a restoration channel, and each pair of end-point nodes connected by a working path formed of at least one working channel in one link, the method comprising the steps of:

(a) monitoring each link to detect a failure of a working channel and, upon detecting a failure, (b) determining if said each link with a failed working channel has at least one available restoration channel able to carry traffic, and if so, then routing traffic on said available restoration channel; but if no restoration channel is available within the each link with the failed working channel, then (c) implementing, at each pair of end-point nodes linked by said working path having the failed channel in a link in said path, a pre-computed path associated with said link having said failed channel, said pre-computed path associated with a said link and identifying a collection of restoration channels in pre-selected links that collectively provide a route between said pair of end-point nodes, each pre-computed path established by the steps of:

(1) determining a set of all available restoration channels except those in a successive one of the links and (2) establishing the pre-computed path P for a successive one of n working channels in a successive one of the links from a collection of available restoration channels, which yields a shortest path between said two end-point bypassing said successive working channel in said successive link;

(3) removing from the set of available restoration channels the channels comprising said precomputed path for said successive working channel in said successive link;

(4) establishing a pre-computed path for a next successive one of n working channels in a successive one of the links from a collection of available restoration channels, which yields a shortest path between said two end-point bypassing said next successive working channel in said successive link;

(5) removing from the set of available restoration channels the channels comprising said pre-computed path for said next one successive working channel in said successive link;

(6) repeating steps (4) and (5) for each next successive working channel in said successive link until pre-computed paths are established for all the working channels in said successive link;

7 repeating steps (2) through (6) for all of the links and routing traffic in said network over said pre-computed path between each said pair of end-point nodes that would otherwise pass traffic over the link having the failed working channel.

18. The method according to claim 17 wherein the routing step includes the steps of:

identifying the pre-computed path to each pair of endpoint nodes that would otherwise pass traffic over the link having the failed working channel; and effecting switching of traffic onto the pre-computed path.

19. The method according to claim 17 wherein the monitoring step includes monitoring each link for a restoration trigger including Loss of Signal, Loss of Frame and Signal Degrade and communicating that condition to each node connected to said each link.

20. The method according to claim 17 wherein the step of routing traffic over the pre-computed path comprises the steps of:

originating a request to effect automatic switching at a first endpoint node to route traffic on an available restoration channel able to carry traffic;

passing the automatic switching request from the first end-point node to a first intermediate node in the pre-computed path that receives the request on a working channel and thereafter passes the request without action to a subsequent node when the restoration channel identified by the pre-computed path is a path of an original path traversing that first intermediate node; otherwise, bridging, at the first intermediate node an incoming channel to an outgoing channel in response to a request on the working channel when outgoing channel is not a part of the original path; but connecting an incoming channel at an intermediate node to an outgoing restoration channel in response to a request on a restoration channel when no channel is part of the original path.

21. The restoration method according to claim 17 further including the steps of:

(a) determining, after implementation of each pre-computed path, whether there exist any links in failure, and if so;

(b) communicating to a restoration path control system, the links still in failure;

(c) determining additional pre-computed paths, each corresponding to a link still in failure; and (d) downloading said additional pre-computed paths to each pair of end point nodes whose connecting path contains a link still in failure.

22. The method according to claim 17 further including the steps of:

(a) determining when a failed working channel on a link is returned to service; and (b) switching traffic back onto the link returned to service.

23. The method according to claim 20 wherein the originating request is communicated on an unused portion of an overhead data block in the traffic traversing the network.

* * * * *